United States Patent [19]

Harbison et al.

[11] Patent Number: 5,846,889

[45] Date of Patent: Dec. 8, 1998

[54] INFRARED TRANSPARENT SELENIDE GLASSES

[75] Inventors: Barry B. Harbison, Dunkirk; Jasbinder S. Sanghera, Greenbelt, both of Md.; John A. Moon, Cumberland, R.I.; Ishwar D. Aggarwal, Fairfax Station, Va.

[73] Assignee: The United States of America as represented by the Secretary of the Navy, Washington, D.C.

[21] Appl. No.: 818,204

[22] Filed: Mar. 14, 1997

[51] Int. Cl.$^6$ ..................................................... C03C 3/32
[52] U.S. Cl. ............................ 501/40; 501/37; 501/904; 65/389; 65/390
[58] Field of Search .............................. 501/37, 40, 904; 65/389, 390

[56] References Cited

U.S. PATENT DOCUMENTS

| | | |
|---|---|---|
| 3,511,992 | 5/1970 | Patterson . |
| 3,655,255 | 4/1972 | Krause et al. . |
| 4,154,503 | 5/1979 | Letington et al. . |
| 4,704,371 | 11/1987 | Krolla et al. . |
| 4,708,942 | 11/1987 | Nishii et al. . |
| 4,730,896 | 3/1988 | Katsuyama et al. . |
| 4,942,144 | 7/1990 | Martin . |
| 5,389,584 | 2/1995 | Aitken et al. . |
| 5,392,376 | 2/1995 | Aitken et al. . |

*Primary Examiner*—Karl Group
*Attorney, Agent, or Firm*—Thomas E. McDonnell; Barry Edelberg

[57] ABSTRACT

A selenide glass with improved mechanical and optical properties such as extended transmission in the infrared region of radiation having wavelengths beyond 15 microns; Tg in the region of 363°–394° C.; and thermal stability of 85°–145° C. based on the difference between $T_g$ and $T_x$, comprising, on mol basis, 20–70% germanium selenide, 0.5–25% gallium selenide, indium selenide or mixtures thereof; and 5–50% of at least one alkaline earth in selenide form is described. A process for improving mechanical and optical properties of a selenide glass based on germanium selenide comprises the steps of mixing glass components, including a modifier in elemental or selenide form; melting the glass components to form a molten mixture; cooling the molten glass mixture to a solid state; annealing the solid glass; and cooling the annealed glass to about room temperature is also described. The glass components can be in elemental form or in the form of selenides, and if in elemental form, then sufficient amount of selenium is added to form selenides of the glass components.

20 Claims, No Drawings

INFRARED TRANSPARENT SELENIDE GLASSES

FIELD OF THE INVENTION

This invention relates to infrared transparent selenide glasses with intermediate compounds, modifiers and, optionally rare earth dopants that can have an infrared fluorescent, super fluorescent or lasing effect. The invention also relates to an improved process for forming these new selenide glasses.

BACKGROUND OF THE INVENTION

Infrared transmitting materials are known and comprise a variety of different materials including crystalline halides, silica and fluoride glasses, and chalcogenide glasses. Crystalline halides undergo plastic deformation and are hygroscopic, requiring cumbersome containment apparatus for IR systems applications. Laser glasses have been developed as host materials for rare earth ions but mainly for applications operating at wavelengths less than 3 microns. Silicate and fluoride glasses have been developed as optical fiber amplifiers but are limited by their high phonon energies relative to chalcogenide glasses. It is widely recognized than longer emission lifetimes and hence, efficiencies, are achieved with lower phonon energy host materials for rare earth ions. The class of chalcogenide glasses includes sulfides, selenides and tellurides respectively with increasing mass and weaker bonding strength. With increasing mass and lower bonding energy the glasses transmit to longer wavelengths due to the lower phonon energies. Sulfide glasses are well known and Harbison et al. in U.S. Pat. No. 5,599,751, herein incorporated by reference, describe an infrared transmitting germanium sulfide glass that would tolerate the addition of rare earth ions in the glass.

Selenide glasses have been based upon As—Se and/or Ge—Se compositions. Glasses based upon As—Se lack the ability to dissolve rare earth ions. Martin in U.S. Pat. No. 4,942,144 teaches that chalcogenide, IR transmitting glasses can be made with the following formula:

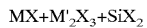

$$MX + M'_2X_3 + SiX_2$$

where M represents a metal selected from calcium, strontium, barium, zinc and lead. M' is the metal used to form network bridging, and represents aluminum or gallium and X representing S, Se or Te. A major problem with these glasses is that $SiS_2$ or $SiSe_2$ is highly hygroscopic and therefore the glasses are unstable in air.

Krolla et al in U.S. Pat. No. 4,704,371 teaches using a germanium selenide with an alkaline earth modifier as a dopant. The patent teaches that the doping with the alkaline earth metals should be in the 0.05 to 1.0 atom percent range to remove oxide—hydroxide impurities and the doping does not change the properties of the glass.

SUMMARY AND OBJECTS OF THE INVENTION

It is an object of this invention to provide a selenide glass that has infrared transmission beyond 15 microns and good transmission in the 2 to 12 micron range.

Another object of this invention is to provide a selenide glass with improved solubility for rare earth ions in the selenide glass.

Another object of the invention is a gallium and indium containing selenide glass with a higher $T_g$, better stability in terms of the difference between $T_x$ and $T_g$ and a longer wavelength light transmitting range when compared with known gallium and indium containing selenide glasses.

Another object of this invention is a process for improving the physical and optical properties of selenide glasses.

These and other objects of the invention are attained by a germanium selenide glass modified with an alkaline earth modifier and an indium selenide, gallium selenide or mixture thereof. The selenide glasses will typically have at least about 5 mol % of an alkaline earth selenide modifier, from 20 to 70 mol % of germanium selenide, 15 to 25 mol % of a gallium selenide or indium selenide or mixtures thereof and, optionally or optically active rare earths. Sulfur can also be substituted for up to 50 mol % of the selenium. The addition of heavy metals strontium, barium and indium to rare earth doped selenides glasses $GeSe_2$ and $Ga_2Se_3$, have produced a new family of selenide glasses with higher glass transition temperatures ($T_g$), greater thermal stability ($T_x$-$T_g$): where $T_x$ is the crystallization temperature, and longer wavelength infrared (IR) transmission than the glasses made from $GeSe_2$ and $Ga_2Se_3$. The new glass compositions provide an excellent host material for rare earth ions whose emissions can produce optical sources of IR light. These glasses, which can accommodate large quantities of rare earth ions result in increased emission efficiency and therefore more intense long wavelength fluorescence than other known infrared glasses.

These and other objects of the invention are obtained by a process for improving the physical and optical properties of a selenide glass by batching the glass components with one or more of the modifiers and melting the mixture under carefully controlled conditions.

DETAILED DESCRIPTION OF THE INVENTION

This invention pertains to modified selenide glasses and to a process for making them. The glass has increased glass transition temperature ($T_g$), greater stability ($T_x$-$T_g$) and transmission to longer infrared wavelengths.

The selenide glasses of this invention contains germanium selenide, a network former selected from gallium selenide or indium selenide or mixture of gallium and indium selenide; one or more modifier selected from barium selenide, strontium selenide, and optionally up to 50 mol percent sulfur substituted for selenium. Another embodiment of the selenide glass of the invention can contain amounts of an optically active rare earth to provide the glass with optical activity. Preferred rare earths includes praseodymium, neodymium, erbium, cerium, dysprosium, holmium, thulium, terbium, ytterbium or mixtures of the rare earths to obtain the desired optical effect the rare earths can be added to the glass batch in the form of elements, halide salts, chalcogenides, chalcohalides and mixtures thereof.

In the selenide glasses of the invention, on a molar basis of the components, the amount of germanium selenide is from about 20 to 70% mol percent, preferably 35 to 65% mol percent and even more preferably 50 to 60% mol percent germanium selenide, the amount of gallium selenide, indium selenide or gallium-indium selenide mixture is 0.5 to 25 mol percent, preferably 1 to 15 mol percent and even more preferably 2.0 to 12.5 mol percent and most preferably 3 to 10 mol percent gallium selenide, indium selenide or a mixture of gallium and indium selenide, and at least 5 mol percent of an alkaline earth selenide, preferably 20 to 50 mol percent, more preferably 25 to 45 mol percent, and even more preferably 30 to 40% of an alkaline earth selenide.

The amount of a rare earth added to the glass to achieve emission of infrared light can be varied up to about 25 mol percent, preferably 0.005 to 15 mol percent, even more preferably 0.01 to 10 mol percent of a rare earth or mixture of rare earths. Sulfur can be substituted for selenium up to about 50 mol percent, preferably less than 30 mol percent. Other conventional infrared glass forming components can also be present in the selenide glass provided that the other components do not substantially affect the properties of the glass.

The selenide glasses of the invention have improved optical and physical properties when compared to previously known gallium/germanium selenide glasses. The improvements include higher glass transition temperature (Tg); thermal stability, as measured by the difference between crystallization temperature (Tx) and glass transition temperature (Tg), greater infrared transmission range and improved transmission at 2–12 microns.

For the selenide glass of the invention, $T_g$ is greater than about 349° C., and is in the range 349° to 399° C. typically about 380° to 399° C., thermal stability $(T_x-T_g)$ exceeds 100° C. and is in the range of 105° to 136° C. typically about 120° C. and transmission of light in the infrared range is extended past 15 microns and shows good transparency past 12 microns. These selenide glasses have improved rare earth ion solubility properties compared to known gallium/germanium selenide glasses and the inventors were surprised to learn that the addition of rare earths either improves thermal stability or has a negligible effect on physical and infrared transmission properties. However the presence of optically active rare earth can result in stimulated emissions of light and fluorescence in the mid-IR range. This ability to solubilize the optically active rare earth ions gives the glass great utility in applications requiring the fluorescent or stimulated emission of infrared light.

A process for improving physical and optical properties of a selenide glass and the process for making the selenide glasses of the invention includes the steps of batching the components of the desired selenide glass, melting the components to form molten glass, cooling the molten glass to solidify it and annealing the selenide glass to relieve internal stresses in the blank.

Batching of the components is done in a dry box maintained at less than about one ppm oxygen and water vapor and under an inert atmosphere. Highly purified components are used in order to enhance infrared transmission especially mid-range infrared transmission. It is preferable to use components in elemental form rather than in the form of salts or compounds, ie as the selenide, since this will yield a glass with a lower impurity level. All components can be purchased with the desired purity in excess of 99.9% pure on a metal basis. Selenium is available with a 99.999+% purity.

The batching step is carried out in a drybox by first weighing out the components. The weighing and batching steps are carried out in a drybox under an inert atmosphere with less that 1 ppm oxygen and water vapor to avoid oxidation and hydrolysis resulting in contamination of the components. If a rare earth is used in the composition, this can be added as the rare earth selenide, a rare earth chalcogenide, rare earth halide or as an elemental rare earth together with selenium to form the rare earth selenide so as to incorporate the rare earth.

If elemental glass components are used selenium is included separately and forms the respective selenides by reacting with the other elemental glass components upon heating. In a dry box the elements are weighed out, batched and then transferred to a vitreous carbon crucible contained within a quartz ampule.

After transferring the glass components into the vitreous carbon crucible contained within a quartz ampoule, the ampule is taken from the drybox, evacuated, and sealed. After sealing the ampoule is heated to melt the contents and allow the contents to react at high temperatures to form the respective selenides. Typical melting schedules would involve ramping the temperature from about room temperature to about 800° to 900° C. at a rate of about 1° to 10° C. per minute, then holding at about 800° to 900° C. for about ten to twenty hours. After heating to about 800° to 900° C. the contents are in a liquid state and are allowed to mix further to achieve a more uniform distribution within the molten glass.

After the melting process the molten glass is quickly quenched from about 600°–900° C. to about Tg or below in order to solidify the glass. Annealing of the glass is accomplished after solidification by extended heating of the glass at slightly above $T_g$ in order to relieve stresses in the glass which may cause cracking/fracture of the glass blank. The glass is then characterized by powder x-ray diffraction and thermal analysis to confirm glass formation.

If the components are added in the form of selenide salts or compounds it is not necessary to heat very slowly in order for the reaction of elemental selenium with the elemental metals to form the respective selenium compounds. Slow heating allows the selenium to fully react with the metal in a controlled manner. If selenide compounds are used, higher levels of oxide and hydroxide impurities are incorporated in the glass which will then will reduce broadband infrared transmission because of absorption by the associated impurities in the residual precursors.

Principle applications of the selenide glass of the invention include optical fibers and domes/windows. Due to its enhanced stability and extended transmission in the infrared region, the glass of the invention can be used to make optical fibers for use in infrared sensors. Due to the extended transmissions range in the infrared region optical fibers made from the novel selenide glasses of the inventions and used in infrared sensors are capable of detecting more chemical species than prior art sulfide or selenide glasses.

The selenide glass of the invention is particularly suitable for the dome/window application on aircraft. In such applications, paramount properties include broadband infrared transparency, good mechanical properties and chemical stability with respect to moisture and heating in the air.

Another important application for the glass of this invention is in doped optical fibers wherein the selenide glass is doped with a rare earth selenide so that the glass has a fluorescent or even stimulated emission of radiation properties as a result of being doped with the optically active rare earth selenide. These selenide glasses of the invention are better laser/amplifier materials because the optical active rare earth ions have superior solubility in the selenide glasses and the glasses have longer wavelength multiphonon absorption resulting in lower probability of non-radiative losses and the potential for longer excited state lifetimes.

The invention having been generally described, the following example is given as particular embodiments of the invention to demonstrate the practice and advantages thereof. It is understood that the example is given by way of illustration and is not intended to limit in any manner the specification or the claims that follow.

EXAMPLE

A silica glass ampoule with a wall thickness of 3 mm containing a vitreous carbon crucible is first washed with dilute nitric acid and dried in an oven at about 110° C. The open end of the ampoule and crucible assembly are then hooked up to a vacuum system consisting of a turbomolecular and mechanical pump. While evacuating the assembly it is heated using an oxygen-methane torch for about on hour or until the vacuum pressure no longer increases indicating the removal of moisture or any other physically adsorbed gasses. The evacuated ampoule assembly ($1\times10^{-6}$ torr) is then sealed off with a valve and brought into a drybox containing less than 1 parts per million (PPM) water and oxygen. In the drybox individual elements are weighed to provide the following glass composition: $(BaSe)_{32.5}$ $(In_2Se_3)_{6.25}$ $(Ga_2Se_3)_{6.25}$ $(GeSe_2)_{55.0}$. The purity of the elements based upon weight percent were Ba-99.9, In-99.99999, Ga-99.99999, Ge-99.9999, and Se-99.995. The selenium was further purified by distilling it to remove water, oxides and carbon. The total weight of the batch is 100 grams with an additional one percent by weight selenium (1 gram) added to provide for volatilization losses during melting. The batch is mixed together and loaded into the vitreous carbon crucible within the ampoule. Using the vacuum valve assembly the ampoule is again sealed, removed from the drybox and hooked up to the vacuum system. The assembly is evacuated for about an hour and then the silica ampoule is sealed off with an oxygen-methane torch. The sealed ampoule is then placed into a furnace and ramped at 1° C./min to 900° C., held at this temperature for 18 hours and then quenched into water. After quenching, the glass is annealed at 390° C. for one hour and cooled at 1° C./min to room temperature. The resulting selenide glass had $T_g$ of 390° C. and $T_x$ of 520° C.

Samples of the selenide glass were prepared in the general manner described above with the compositions, $T_g$ and $T_x$ and results of optically active rare earth addition reported below in Table 1. Sample 14 corresponds to the example given above. In Table 1, amounts of the glass components are given in mol percent and the glass components were gallium selenide ($Ga_2Se_3$), germanium selenide ($GeSe_2$), barium selenide (BaSe), strontium selenide (SrSe), and indium selenide ($In_2Se_3$). The rare earths are praseodymium (Pr), neodymium (Nd), dysprosium (Dy), erbium (Eb) and ytterbium (Yb). The fluorescent transitions, pump wavelength, output wavelength and time for the fluorescent lifetimes are also given in Table 1.

Many modifications and variations of the present invention are possible in light of the above disclosed techniques. It is therefore to be understood that within the scope of the appended claims that the invention may be practiced otherwise than as specifically described.

We claim:

1. A selenium glass, substantially free of crystallites, comprising on a mol basis, at least 5% of an alkaline earth selenide, from 20 to 70% $GeSe_2$ and from 0.5 to 25% of a group IIIA selenide selected from gallium selenide, indium selenide, and mixtures thereof; wherein said selenide glass is substantially free of silicon.

2. The selenium glass of claim 1 wherein the selenium glass is doped with a rare earth or mixture of rare earths.

3. The selenium glass of claim 1 wherein the selenium glass is doped from 0.005 to 25% of a rare earth or mixture of rare earths.

4. The selenium glass of claim 1 wherein the glass contains up to fifty percent sulfur substituted for selenium.

5. The selenium glass of claim 1 wherein the glass components comprise on a mol basis 20 to 50 percent of an alkaline earth selenide, 35 to 65 percent germanium selenide and 1.0 to 15 mol percent gallium selenide, indium selenide or mixtures of gallium and indium selenide.

6. The selenium glass of claim 1 wherein the difference between $T_g$ and $T_x$ is greater than 85° C.

7. The selenium glass of claim 2 wherein the difference between $T_g$ and $T_x$ is greater than 85° C.

8. The selenium glass of claim 1 wherein the alkaline earth is barium.

9. The selenium glass of claim 2 wherein the alkaline earth is barium.

10. The selenium glass of claim 2 wherein the rare earth is praseodymium (Pr), neodymium (Nd), dysprosium (Dy), erbium (Eb), ytterbium (Yb), holmium (Ho), terbium (Tb), thulium (Tm), cerium (Ce) and mixtures thereof.

11. The selenium glass of claim 3 wherein the rare earth is praseodymium (Pr), neodymium (Nd), dysprosium (Dy), erbium (Eb), ytterbium (Yb), holmium (Ho), terbium (Tb), thulium (Tm), cerium (Ce) and mixtures thereof.

12. A process for making selenide glasses substantially free of crystallites comprising the steps of batching the glass components, melting the glass components to form a molten mixture, cooling the molten glass mixture to a solid state, annealing the glass in the solid state, and slowly cooling the

TABLE 1

| Sample | BaSe | SrSe | $Ga_2Se_3$ | $In_2Se_3$ | $GeSe_2$ | RE | $T_g$ °C. | $T_x$ °C. | Transition | Pump $\lambda(\mu m)$ | Meas $\lambda(\mu m)$ | Time $(\mu m)$ |
|---|---|---|---|---|---|---|---|---|---|---|---|---|
| #1 | 35.5 | 0 | 12.5 | 0 | 55.0 | 0 | 395 | 530 | — | — | — | — |
| #2 | 35.2 | 0 | 6.25 | 6.25 | 55.0 | 0.1% Pr | 363 | 499 | $^3F_3/^3F_4\text{-}>^3H_5$ | 1.57 | 2.5 | 106 |
|  |  |  |  |  |  |  |  |  | $^3F_3/^3F_4\text{-}>^3H_4$ | 1.57 | 1.6 | 106 |
|  |  |  |  |  |  |  |  |  | $^3H_6\text{-}>^3H_5, ^3H_5\text{-}>^3H_4$ | 1.57 | 4.5 | 500 |
| #3 | 32.5 | 0 | 6.25 | 6.25 | 55.0 | 1.0% Pr | 385 | 525 | $^3H_6\text{-}>^3H_5, ^3H_5\text{-}>^3H_4$ | 2.00 | 2.7–5.5 | 60 |
| #4 | 32.5 | 0 | 6.25 | 6.25 | 55.0 | 0.2% Pr | 381 | 505 | — | — | — | — |
| #5 | 0 | 32.5 | 6.25 | 6.25 | 55.0 | 0.2% Pr | 387 | 521 | — | — | — | — |
| #6 | 32.5 | 0 | 6.25 | 6.25 | 55.0 | 0.1% Nd | 391 | 521 | — | — | — | — |
| #7 | 32.5 | 0 | 6.25 | 6.25 | 55.0 | 0.2% Dy | 349 | 488 | $^6H_{11/2}\text{-}>^3H_{13/2}$ | 1.064 | 4.3 | 600 |
| #8 | 32.5 | 0 | 6.25 | 6.25 | 55.0 | 0.2% Tb | 394 | 499 | $^7F_5\text{-}>^7F_6$ | 2.0 | 2.7–5.5 | <30 |
| #9 | 325 | 0 | 6.25 | 6.25 | 55.0 | 0.1% Er 0.1% Dy | 391 | 511 | $^6H_{11/2}\text{-}>^3H_{13/2}$ | 1.064 | 4.3 | 520 |
| #10 | 32.5 | 0 | 6.25 | 6.25 | 55.0 | 0.1% Yb 0.1% Dy | 384 | 488 | $^6H_{11/2}\text{-}>^3H_{13/2}$ | 1.064 | 2.7–5.5 | 70 |
| #11 | 32.5 | 0 | 6.25 | 6.25 | 55.0 | 10.0% Dy | 399 | 520 | $^6H_{11/2}\text{-}>^3H_{13/2}$ | 1.064 | 4.3 | ~5 |
| #12 | 37.5 | 0 | 7.5 | 0 | 55.0 | 0.2% Dy | 384 | 489 | — | — | — | — |
| #13 | 32.5 | 0 | 0 | 12.5 | 55.0 | 0.2% Dy | 370 | 488 | — | — | — | — |
| #14 | 32.5 | 0 | 6.25 | 6.25 | 55.0 | 0 | 390 | 520 | — | — | — | — | annealed glass to about room temperature; the glass components comprise, on a mol basis at least 5% of an alkaline earth selenide, from 20 to 70% GeSe$_2$ and from 0.5 to 25% of a group IIIA selenide selected from gallium selenide, indium selenide, and mixtures thereof; or the glass components can be in elemental form in an amount approximately equivalent to their selenide form and wherein said selenide glass is substantially free of silicon.

13. The process of claim 12 wherein said batching step includes adding at least one rare earth or mixture of rare earths to the glass components.

14. The process of claim 12 wherein said batching step includes the addition of an excess of selenium on a mol basis.

15. The process of claim 13 wherein said rare earths are praseodymium (Pr), neodymium (Nd), dysprosium (Dy), erbium (Eb), ytterbium (Yb), holmium (Ho), terbium (Tb), thulium (Tm), cerium (Ce) and mixtures thereof.

16. The process of claim 12 wherein the wherein the glass components comprise on a mol basis 20 to 50 percent of an alkaline earth selenide, 35 to 65 percent of germanium selenide and 1.0 to 15 mol percent gallium selenide, indium selenide or mixtures of gallium and indium selenide.

17. The process of claim 13 wherein the glass after formation, the difference between $T_g$ and $T_x$ is greater than 85° C.

18. The process of claim 13 wherein the glass components comprise on a mol basis 20 to 50 percent of an alkaline earth selenide, 35 to 65 percent of germanium selenide and 1.0 to 15 mol percent gallium selenide, indium selenide or mixtures of gallium and indium selenide.

19. The process of claim 16 wherein the glass components comprise on a mol basis 25 to 45 percent of an alkaline earth selenide, 2.0 to 12.5 percent of gallium selenide and 50 to 60 percent of germanium selenide.

20. The selenide glass of claim 1 wherein the glass is formed into an infrared transmitting optical fiber.

* * * * *